No. 799,668. PATENTED SEPT. 19, 1905.
A. R. PRITCHARD.
DOUGH KNEADER AND MIXER.
APPLICATION FILED MAY 29, 1905.

WITNESSES:
Clarence W. Carroll
L. Thon.

INVENTOR:
Albert R Pritchard

UNITED STATES PATENT OFFICE.

ALBERT R. PRITCHARD, OF ROCHESTER, NEW YORK.

DOUGH KNEADER AND MIXER.

No. 799,668.  Specification of Letters Patent.  Patented Sept. 19, 1905.

Application filed May 29, 1905. Serial No. 262,718.

*To all whom it may concern:*

Be it known that I, ALBERT R. PRITCHARD, a citizen of the United States, and a resident of Rochester, in the county of Monroe and State of New York, have invented certain new and useful Improvements in Dough Kneaders and Mixers, of which the following is a specification.

This invention relates to dough kneaders and mixers; and it consists in the device hereinafter described and claimed.

Figure 1:
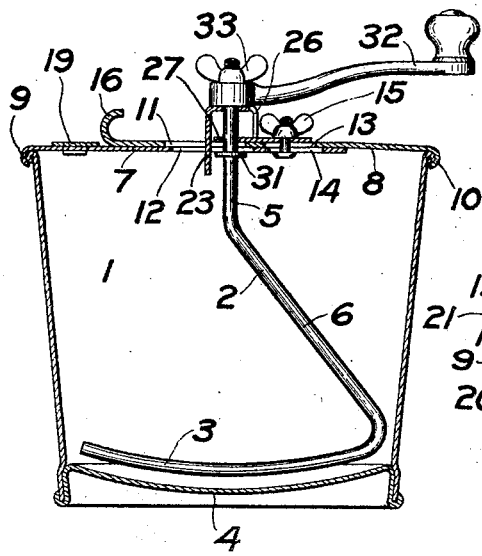
Figure 2:
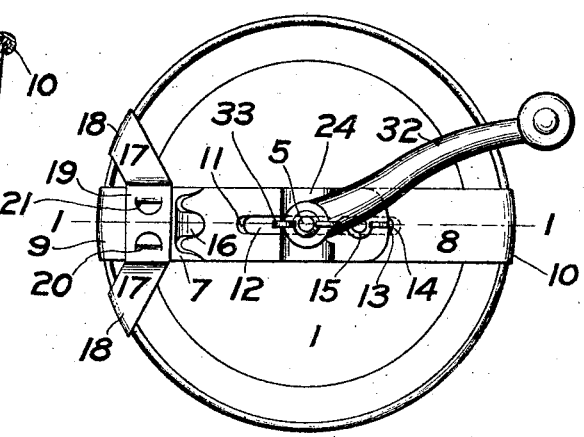
Figure 3:
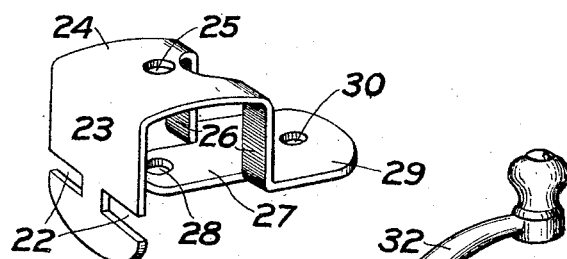
Figure 4:
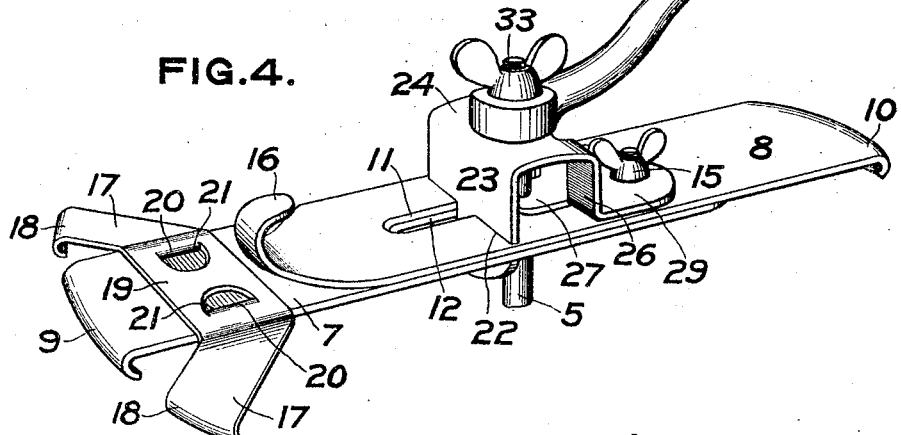

In the drawings, Figure 1 is a vertical section of a dough-mixer on the line 1 1 of Fig. 2. Fig. 2 is a top plan view of the same device. Fig. 3 is a detail perspective view of the bearing device for the mixing-rod, and Fig. 4 is a perspective view of a part of the mixing-rod on its supporting device.

The pail or pan 1 is adapted to hold the dough mixture and contains the stirring-rod 2, having the substantially horizontal portion 3, which lies close and parallel to the bottom 4 of the pail or pan, with each end as close to the sides of the pail as is possible without contact. A vertical portion 5 of said rod passes through bearings in the vertical axis of the pail or pan, and a connecting portion 6 connects said vertical portion 5 and said horizontal portion 3 of the rod. An adjustable support passes diametrically across the top of the pail and consists of the two portions or bars 7 and 8, having on their respective ends the downturned end or hooks 9 and 10 for engaging over diametrically opposite portions of the top edge of the pail or pan. One of said bars slides upon the other, and both bars have registering slots 11 12 for purposes to be described. The vertical portion 5 of the stirring-rod passes through both slots 11 and 12. The same slots 11 and 12 may be long, or, as shown in Fig. 1, there may be in addition independent registering slots 13 and 14 in the said bars 7 and 8. A thumb-nut 15 passes through both bars 7 and 8—as, for instance, through the slots 13 and 14—and when clamped locks the bars 7 and 8 in the desired relative position to each other. The upper bar 8 carries a hook 16 or other projection, so that the finger may rest against the hook while the thumb presses against the end 9 of the bar 7, so that upon grasping the two parts the ends 10 and 9 will be brought together, so as to clamp on opposite edges of the pan or pail 1, and upon setting the locking device 15 the parts will maintain their adjusted position.

In order to provide a rigid bearing for the bars 7 and 8, lateral supporting arms or braces 17 are employed having preferably the downturned or hooked ends 18 adapted to fit over adjacent portions of the edge of the pail or pan. The arms 17 are suitably attached to one of the bars, and the broadened bearing upon the top edge of the pail created by said arms 17 provides the rigidity above mentioned when the device is operated. It is preferred to connect the bars 17 by an integral connecting-piece 19, fastened transversely across the end of one of said bars, and to cut out and turn down therefrom ears 20, which extend into slots 21 in the bar to which this device is attached. These ears 20 connect the arms 17 rigidly to the bar.

A bearing is provided for the vertical portion 5 of the stirring-rod. The preferred form of this bearing is shown most clearly in Fig. 3 and consists of a single sheet of metal having near one end the lateral slots 22, of the same width as the combined thickness of the bars 7 and 8. The sheet of metal is then bent so that the end 23, containing the slots 22, is substantially vertical, and substantially at right angles to the portion 23 there is a pivoted portion 24, which is provided with a bearing-perforation 25, fitting said vertical portion 5 of the stirring-rod. The said sheet continues in a portion 26, turning down and substantially parallel to the portion 23, from which portion 26 is cut a tongue portion 27, provided with a bearing-perforation 28 in line with the perforation 25. The sheet of metal continues at right angles to the portion 26 to form the flat plate 29, that rests upon the upper of the bars 7 8, and has a perforation 30, through which passes the locking device or thumb-nut 15, so that the bearing for the rod 5 may be suitably centered in the pail or pan. The rod 5 has the collar 31, which rests against the under side of the lower of the two sides 7 8, and on the upper end of said rod 5 is fastened the handle 32 in any suitable way, such as by the thumb-nut 33. The handle rests on the portion 24. It will be noticed that the greater part of this rod-supporting device is formed of pieces, which may be stamped and formed from sheet metal by dies.

The assembling is done as follows: The arms 17 are fastened as described to one of the bars—such, for instance, as the bar 7—then the bar 8 is laid upon the other bar 7, so that the slots of each register with those of the other. Then the bearing device is inserted by passing the end of the portion 23 through the slots 11 and 12 and turning the device until it takes the position shown in Fig. 4. Then the thumb-nut 15 is put in place through the slots 13 and 14 and the perforation 30 and the stirring-rod is inserted from the under side through the slots 11 12 and through the perforations 28 and 25. Then the handle is put upon it, and the thumb-nut 33 locks the handle in place. If the thumb-nut 15 is loosened and the slots in the two bars 7 8 are of proper length, the device may be fitted easily to pails or pans of widely-different diameters.

What I claim is—

1. In a dough kneader and mixer, a pail or pan, a stirring-rod having a handle and a support for said stirring-rod consisting of bars slidable with reference to each other and having ends adapted to engage the opposite sides of the pail or pan, a finger-hook on the end of one bar in such relative position to the end of the other bar that the two may be grasped by one hand, and a locking device for fastening the two bars in different adjusted positions.

2. In a dough kneader and mixer, a pail or pan, a stirring-rod having a handle and a support for said stirring-rod consisting of bars slidable with reference to each other and having ends adapted to engage the opposite sides of the pail or pan, a finger-hook on the end of one bar in such relative position to the end of the other bar that the two may be grasped by one hand, a locking device for fastening the two bars in different adjusted positions, and a bearing device for said rod adapted to be moved in said bars and to be locked in variable positions thereon.

3. In a dough kneader and mixer, a pail or pan, a stirring-rod having a handle and a support for said stirring-rod consisting of bars slidable with reference to each other and having ends adapted to engage the opposite sides of the pail or pan, a plate having a hook at each end adapted to fit over adjacent portions of a pail edge and fastened transversely across the end of one of said bars, a finger-hook on the end of one bar in such relative position to the end of the other bar that the two may be grasped by one hand, and a locking device for fastening the two bars in different adjusted positions.

4. In a dough kneader and mixer, a pail or pan, a stirring-rod having a handle and a support for said stirring-rod consisting of bars slidable with reference to each other and having ends adapted to engage the opposite sides of the pail or pan and provided with registering slots, a locking device for fastening the two bars in different adjusted positions, and a bearing device for said rod engaged in said slots and by said locking device.

5. In a dough kneader and mixer, a pail or pan, a stirring-rod having a handle and a support for said stirring-rod consisting of bars slidable with reference to each other and having ends adapted to engage the opposite sides of the pail or pan and provided with registering slots, a locking device for fastening the two bars in different adjusted positions, and a bearing device for said rod consisting of two bearing portions for said rod, a slotted portion for engaging in the slots in said bars and a portion engaged by said locking device.

6. In a dough kneader and mixer, a pail or pan, a stirring-rod having a handle, and a support for said stirring-rod consisting of bars slidable with reference to each other and having ends adapted to engage the opposite sides of the pail or pan and provided with registering slots, a locking device for fastening the two bars in different adjusted positions, and a bearing device for said rod consisting of a vertical bent plate having slots for engaging the slots in said bars, a horizontal portion having a bearing-perforation for the rod, a perforated portion having a second bearing for said rod and an end portion lying upon the said bars and adapted to be held thereto by said locking device.

ALBERT R. PRITCHARD.

Witnesses:
D. GURNEE,
L. THON.